(12) United States Patent
Rashid (10) Patent No.: US 8,780,219 B2
(45) Date of Patent: Jul. 15, 2014

(54) WIRELESS VIEWING AND CONTROL INTERFACE FOR IMAGING DEVICES

(75) Inventor: Usman Rashid, Irvine, CA (US)

(73) Assignee: Wooblue, Inc.

( * ) Notice: Subject to any disclaimer, the term of this patent is extended or adjusted under 35 U.S.C. 154(b) by 177 days.

(21) Appl. No.: 13/555,871

(22) Filed: Jul. 23, 2012

(65) Prior Publication Data

US 2014/0022399 A1    Jan. 23, 2014

(51) Int. Cl.
*H04N 5/232* (2006.01)

(52) U.S. Cl.
USPC ..................................... 348/211.8; 348/211.2

(58) Field of Classification Search
USPC .................. 348/207.1–207.2, 211.99–211.14
See application file for complete search history.

(56) References Cited

U.S. PATENT DOCUMENTS

| | | | |
|---|---|---|---|
| 6,909,457 B1 * | 6/2005 | Fukasawa | 348/211.11 |
| 7,161,619 B1 * | 1/2007 | Niida et al. | 348/207.11 |
| 7,340,275 B2 | 3/2008 | Hamamura | |
| 7,355,633 B2 * | 4/2008 | Kurosawa et al. | 348/211.8 |
| 7,366,468 B2 | 4/2008 | Yoshida | |
| 7,522,197 B2 | 4/2009 | Takhashi | |
| 7,606,903 B2 | 10/2009 | Takahashi | |
| 7,649,551 B2 | 1/2010 | Ohmura et al. | |
| 7,742,786 B2 | 6/2010 | Watanabe | |
| 7,764,308 B2 | 7/2010 | Kusaka et al. | |
| 7,800,654 B2 | 9/2010 | Idemura | |
| 7,999,854 B2 | 8/2011 | Kazami et al. | |
| 8,099,468 B2 | 1/2012 | Iwasawa et al. | |
| 8,115,862 B2 | 2/2012 | Umeyama et al. | |
| 8,126,998 B2 | 2/2012 | Ikeda | |
| 8,131,859 B2 | 3/2012 | Fujii et al. | |
| 8,150,449 B2 | 4/2012 | Onozawa | |
| 8,156,349 B2 | 4/2012 | Nagamine | |
| 2002/0191082 A1 * | 12/2002 | Fujino et al. | 348/211.14 |
| 2003/0193576 A1 * | 10/2003 | Fujii | 348/211.8 |
| 2006/0284982 A1 * | 12/2006 | Bigioi et al. | 348/207.1 |
| 2007/0291128 A1 * | 12/2007 | Wang et al. | 348/211.2 |
| 2011/0211645 A1 | 9/2011 | Nitta et al. | |

* cited by examiner

*Primary Examiner* — Twyler Haskins
*Assistant Examiner* — Dwight C Tejano
(74) *Attorney, Agent, or Firm* — Stetina Brunda Garred & Brucker (57) ABSTRACT

An interface system for an imaging device is disclosed. A first data communications interface is connected to a web server and a second data communications interface is connectible to a corresponding input/output port of the imaging device. There is a bridge application server with a device control input, a device image output, a device control output, and a device image input. The device control input is connected to the first data communications interface, and the device image output is connected to the web server. The device control output and the device image input are both separately linked to the second data communications interface. Generic device control commands from the first data communications interface are passed to the bridge application server, bypassing the web server. Image data from the imaging device is passed to the web server for transmission to a remote viewer and control device.

24 Claims, 6 Drawing Sheets

WIRELESS VIEWING AND CONTROL INTERFACE FOR IMAGING DEVICES

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to imaging systems and wireless communications devices. More particularly, the present disclosure pertains to a wireless viewing and control interface for imaging devices.

2. Related Art

While tracing its origins to a chemical-based process utilizing light-sensitive film, photography, at both the professional and amateur levels, has now been digitized. Fundamentally, photography involves the focusing of a specific amount of light from the scene of interest for a specific duration on to a photosensitive element of a specific sensitivity. In digital imaging systems, the photosensitive element is a sensor that converts photons of light into electronic signals. How much or wide/narrow of the scene that is recorded is determined by the focal length of the focusing lens, and an adjustable aperture within the lens sets the intensity of light that is passed to the sensor. The imaging device or camera also includes a shutter that opens and closes in response to user activation, and the duration for which the sensor is exposed to the light passing through the lens is defined by the shutter speed. The electronic signals corresponding to the different wavelengths and intensities of light are then converted to digital data via an analog-to-digital converter (ADC). The total exposure (a combination of intensity and duration) needed for a proper image also depends upon the sensitivity or speed of the sensing element, which can be variably set in the case of electronic sensors. The data is then stored on an on-board memory device such as flash memory.

Each of the aforementioned functions of the camera may be controlled by a central processor. For instance, the shutter button may be an electronic push button integrated into the camera body, with inputs thereto producing a command to the central processor. In response, the central processor may generate a signal to a shutter actuator that trips the shutter, along with another signal to the sensor for activating its elements to record the image data.

As indicated above, cameras have several adjustable settings, including focus, shutter speed, and aperture. Manual adjustment of focus may be possible via a focusing ring on the lens that mechanically manipulates the relative position of aperture to the sensing element. Furthermore, manual adjustment of shutter speed may be possible via a knob or other mechanical input integrated into the camera body that, depending on its position, can slow down or speed up the shutter actuation from closed, to opened, and back to closed again. Typically, shutter speed is adjustable in certain predefined increments, for example, $1/10$ seconds, $1/60$ seconds, $1/250$ seconds, etc. The aperture opening size may be adjustable via an aperture or f/stop ring mechanically coupled to the aperture in the lens. Again, aperture size is typically adjustable in certain predefined increments, for example f/1.4, f/2, f/2.8, f/4, etc. Where the focal length is adjustable as is the case with zoom lenses, the lens may be incorporated with a zoom ring, or in the alternative, two inter-reciprocating parts, that can manipulated to lengthen or shorten the physical distance between lens elements. Each of these manually adjustable settings may be provided to the central processor as data inputs, where it is utilized generate a proper image.

Conventional cameras may include various automation features such as auto-exposure and auto-focus that can reduce the need for some of the more technical photography skills needed to produce a decent picture. Sensors needed to implement such functionality may likewise be incorporated into the camera system and connected to the central processor, which can calculate and set the needed parameters to generate a proper image. In addition to these functions, the central processor may also perform color balancing, exposure adjustments, and other limited image enhancement procedures once the image is captured and stored.

In a typical workflow, once a series of desired images are captured, or once the memory device has been filled with images to capacity, the memory device is manually removed from the camera and connected to a general purpose computer system to where the image data is copied. The saved images may be viewed or enhanced as desired, whereupon correction and enhancement may be incorporated into print or digital media. Since most conventional cameras are equipped with on-board display devices, a limited preview of the captured image may be shown thereon. However, because of the limited size form factor of the camera, so is the display device, thereby presenting a less than desirable view of the captured image and limiting the level of its discernible details.

With the central processor controlling practically every aspect of operation, the camera essentially becomes a general purpose image input device. Some manufacturers have developed add-on devices that connect to a data output port of the camera, and wirelessly transmit images as they are captured by the camera in response to the photographer pressing the shutter button to a base station. The base station is then connected to a general-purpose computer, from which the captured images can be viewed and manipulated. Such existing devices are proprietary to the camera for which it is designed, and accordingly the remote control of the settings and operation of the camera were limited. Accordingly, there is a need in the art for an improved wireless viewing and control interface for imaging devices.

BRIEF SUMMARY

The present disclosure includes various embodiments of wireless viewing and control interfaces for imaging devices, in particular, digital cameras, as well as methods for controlling the same. Images captured by the camera can be remotely viewed on various Wireless Local Area Network (WLAN) connected portable computer devices such as tablets, laptops, and even smart phones. Such devices can also accept inputs that can be passed to the camera. The interface may be attachable to the camera.

In accordance with one embodiment, there is an interface system for an imaging device. There may be a first data communications interface, and a second data communications interface connectible to a corresponding input/output port of the imaging device. Furthermore, there may be a web server, which can be connected to the first data communications interface. There may additionally be a bridge application server with a device control input, a device image output, a device control output, and a device image input. The device control input may be connected to the first data communications interface, and the device image output may be connected to the web server. The device control output and the device image input may both be separately linked to the second data communications interface. Generic device control commands received from the first data communications interface may be passed to the bridge application server bypassing the web server. Image data received from the imaging device via the second data communications interface may be passed to the web server for transmission to a remote viewer and control device.

According to another embodiment, there is disclosed a wireless camera control and view system that is attachable to a camera. The system may include an on-board power source. Additionally, the system may include a wireless networking interface linkable to a remote viewer and control device. There may also be a serial data communications interface connectible to an input/output interface of the camera. The system may further include a central processor module that is connected to the wireless networking interface and the serial data communications interface. The central processor module may be programmed with executable instructions of a bridge application server and a web server. The bridge application server may include a socket server receptive to generic camera control commands from the wireless networking interface. Moreover, the bridge application server may include a camera command interpreter that translates the generic camera control commands to camera-specific control commands parsable by the camera. The web server may be receptive to image data from the camera and image requests from the remote viewer and control device. The web server may generate a page including image data in response to a corresponding image request for transmission to the remote viewer and control device.

The present disclosure also contemplates a method for controlling a camera. The method may include receiving a generic control command on a socket server over a first data communications link. The generic control command may originate from a remote viewer and control device. The socket server may be assigned a first network port identifier, which may correspond to a transmission destination port that is specified in the generic control command. The method may also include translating the generic control command to a camera-specific control command. Additionally, there may be a step of transmitting the camera-specific control command to the camera over a second data communications link. The method may further include receiving camera data from the camera over the second data communications link. The camera data may be generated in response to the camera-specific control command. There may be a step of passing the camera data to a web server, which is assigned a second network port identifier. The method may further include transmitting the camera data to the remote viewer and control device. A source port identifier of the camera data may be the second network port identifier of the web server. The socket server and the web server may be assigned a common Internet Protocol address.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of the several presently contemplated embodiments of a wireless viewing and control interface for imaging devices. This description is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
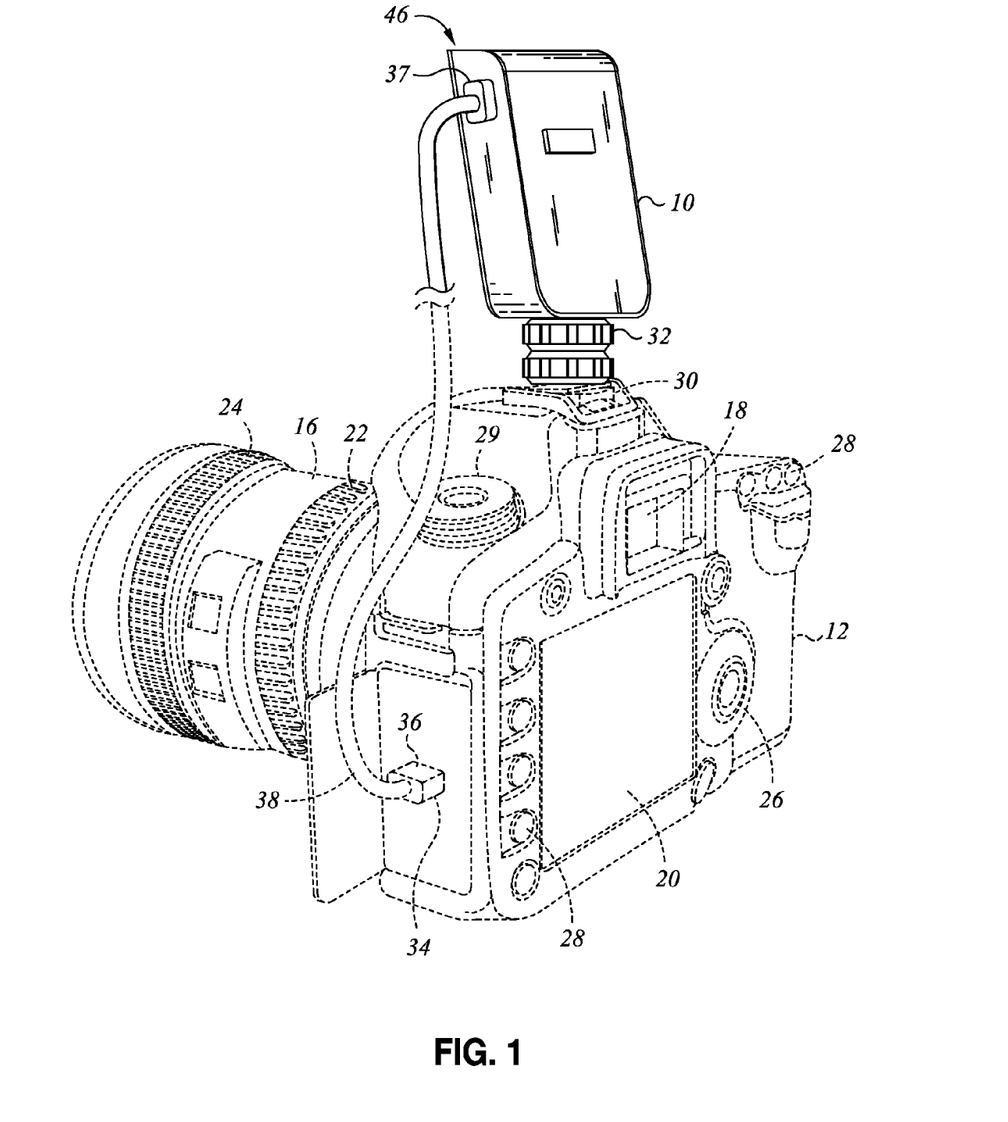
FIG. 1 is a rear perspective view of one embodiment of a wireless camera control and view system attached to a camera.

FIG. 1 illustrates one embodiment of an interface system 10 attached to an imaging device 12. More particularly, the imaging device 12 is understood to be a digital camera that is generally comprised of a body unit 14 and a separable lens unit 16. The body unit 14 includes a sensor that converts the photons of light captured and focused thereon through the lens unit 16 into a sequence of data representative of the image or photograph. The depicted camera or imaging device 12 is understood to be a single lens reflex type, otherwise known in the art as an SLR, where the framing of the scene visible through a viewfinder 18 is identical to that which is captured by the sensor. An internal moving mirror may selectively direct the light from the lens unit 16 to either the viewfinder 18 or the sensor. The captured image may be previewed on a display screen 20, and stored on a memory device for subsequent retrieval. Other types of cameras are known in the art, including rangefinders, twin lens reflex, and point-and-shoot cameras, which oftentimes omit the viewfinder 18 in favor of a real-time preview shown on a display screen 20. The embodiments of the present disclosure are described with reference to the depicted digital SLR camera of FIG. 1, but it will become apparent to those having ordinary skill in the art that any suitable digital camera may be substituted.

As mentioned above, an exposure captured by the camera, or any imaging device for that matter, is fundamentally governed by the three reciprocal parameters of aperture size or f/stop, shutter speed, and sensor sensitivity/ISO. Further, the angle of view and magnification is determined by focal length, while the degree of convergence of light from the captured scene is determined by focus, or the distance between the aperture and the sensor element. An image is captured in response to tripping the shutter. Color in an image is reproduced based upon relative difference values from one pixel element to another. For accurate visual reproduction, a key value against which all others are compared must be set, also known in the art as white balance. Conventional digital cameras include general purpose data processors that handle all of its operational aspects, from setting the f/stop, shutter speed, ISO, white balance, focus, and focal length, to detecting the activation of the shutter button.

Digital cameras capture photographs as a sequence of pixel data representative of the image from sensor element. This sequence of data can be recorded or formatted in a various ways. For instance, raw sensor data from every pixel may be recorded. Conventional sensors may have tens of millions of sensor elements, meaning file sizes in the tens of megabytes as each pixel may be represented multiple bits. In order to conserve space, lossy compression formats such as JPEG (Joint Photographic Experts Group) may be applied upon image capture, with differing compression rates being possible. The level of compression, or the option of applying compression at all, may also be set directly on the camera.

It is possible for the photographer to input certain of these parameters to the processor via intuitive controls that are similarly configured as those of mechanical cameras. For instance, the lens unit 16 may include a focus ring 22 around its barrel that can be rotated amongst different positions representative of focus settings. The position may be detected electronically and passed to the processor. Similarly, the lens unit 16 may include a zoom ring 24 that can also be rotated amongst different positions representative of different focal length settings. Again, its position can be detected electronically and passed to the processor. In most cases, the focus ring 22 and the zoom ring 24 are coupled to the appropriate mechanical elements of the lens unit 16, though it is also possible for the processor to transmit control signals to actuators that correspondingly manipulate such settings.

More of the commonly manipulated settings such as shutter speed and f/stop may be manipulated via control dial 26 and control buttons 28. The processor may run a menu-based user interface application presented on the display screen 20, via which additional settings may be manipulated. Although the control dial 26 and the control buttons 28 may be assigned a default function, additional functions may be assigned via the menu-based user interface application.

Varying levels of automation are possible with the operation of the camera being governed by the processor. These shooting modes are selectable via a control knob 29. In a fully automatic shooting mode, all that is required of the photographer is to frame the desired scene and activate the shutter button. Depending on the lighting conditions, the f/stop, shutter speed, white balance, and sensitivity settings are automatically adjusted. Alternatively, in a shutter priority mode, the photographer sets the desired shutter speed, while the f/stop and sensitivity settings are automatically adjusted to accommodate the set shutter speed while achieving a proper exposure. Most embodiments of SLR cameras also have an aperture priority mode in which the photographer sets the desired f/stop value while the shutter speed and sensitivity settings are automatically adjusted. Furthermore, a manual mode in which all of the aforementioned parameters are adjustable is also incorporated. Besides the foregoing shooting modes, others optimized for specific conditions such as athletic events, evening or low light scenarios, and others may also be incorporated and selectable via the control knob 29.

Figure 2:
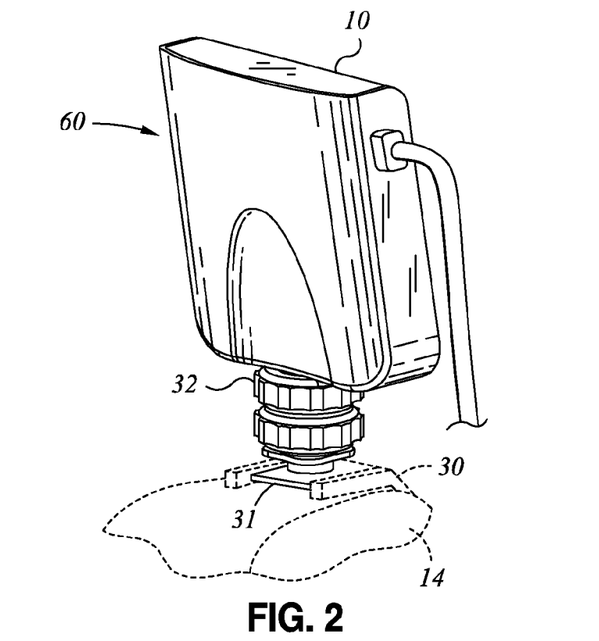
FIG. 2 is front perspective view of the wireless camera control and view system.

With additional reference to FIG. 2, the body unit 14 may incorporate a hot shoe 30, and as its name suggests, it may include electrical terminals through which an attached supplemental lighting device or flash unit may be powered. The hot shoe 30 also serves as the mechanical attachment point of the flash unit to the body unit 14 the size and shape of the hot shoe 30 is standardized to accommodate peripheral devices from different manufacturers. Generally, the hot shoe 30 has open slot configuration through which a matching adapter 31 on a peripheral device may be inserted. Although most often utilized with flash units, in accordance with various embodiments of the present disclosure, the hot shoe 30 is utilized to secure the interface system 10 to the body unit 14. In this regard, the interface system 10 may include a clamping fastener knob 32 that locks the adapter 31 to the slot of the hot shoe 30. Other mechanical attachment modalities of the interface system 10 are also contemplated, however, such as brackets that mount to an underside tripod receptacle.

The on-board data processors of digital cameras are general purpose and can accordingly perform a wide variety of functions to the extent they are programmed therefor. One common function of all digital cameras is the processing and storage of the captured sensor data. The imaging device 12 typically has a removable memory device that can be utilized to transfer recorded data to another computer system. Alternatively, the imaging device 12 may include a data communications module through which a remote computer system can request and retrieve the stored data. The example camera includes a data communications port 34, to which a corresponding connector 36 and cable 38 can be attached. In one embodiment of the present disclosure, the data communications port 34, the connector 36, and the cable 38 are Universal Serial Bus (USB)-compatible. The interface system 10 likewise includes a USB data communications port 40, to which the other end of the cable 38 is connected via the connector 37. As will be described more fully below, the interface system 10 communicates with the imaging device 12 to exchange data.

Figure 3:
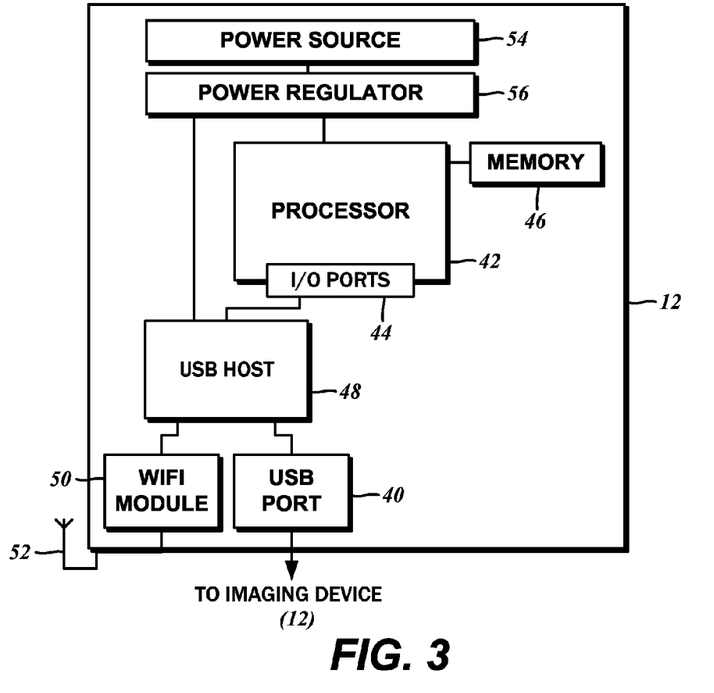
FIG. 3 is a block diagram illustrating the electrical components of the wireless camera control and view system.

Referring now to the block diagram of FIG. 3, the interface system 10 is comprised of several hardware components. In further detail, there is a general-purpose microcontroller or processor 42 with one or more input/output ports 44. The processor 42 utilizes a memory module 46 to store executable program instructions that implement the various functions of the interface system 10, along with the data appurtenant thereto. The input/output port 44 is connected to a USB host interface 48 that manages the exchange of data between the processor 42 and any peripherals attached to the USB port 40.

Various embodiments of the present disclosure contemplate the use of Wireless Local Area Network (WLAN) communications, also referred to in the art as WiFi, to exchange data with remote devices. Accordingly, the interface system 10 includes a Wi-Fi module 50, which may also be referenced herein as a first data communications interface. Those having ordinary skill in the art will recognize the typical components of a WiFi module implementation such as an antenna 52, the transceiver, the power amplifier, and the low noise amplifier. According to one embodiment, the WiFi module 50 is connected to the USB host 48, which is intended to provide a unified and standardized input/output modality to the processor 42. However, it is also possible to directly connect the WiFi module 50 to the input/output ports 44.

The foregoing hardware components are all powered by an on-board power source 54, which is further connected to a power regulator 56 that stabilizes the voltage and current. It is understood that the power source 54 is a battery that can be recharged via a power line of the USB port 40. In this regard, the power regulator 56 is also understood to include a charging circuit. Numerous rechargeable battery technologies are known in the art, and any can be substituted without departing from the scope of the present disclosure.

Figure 4:
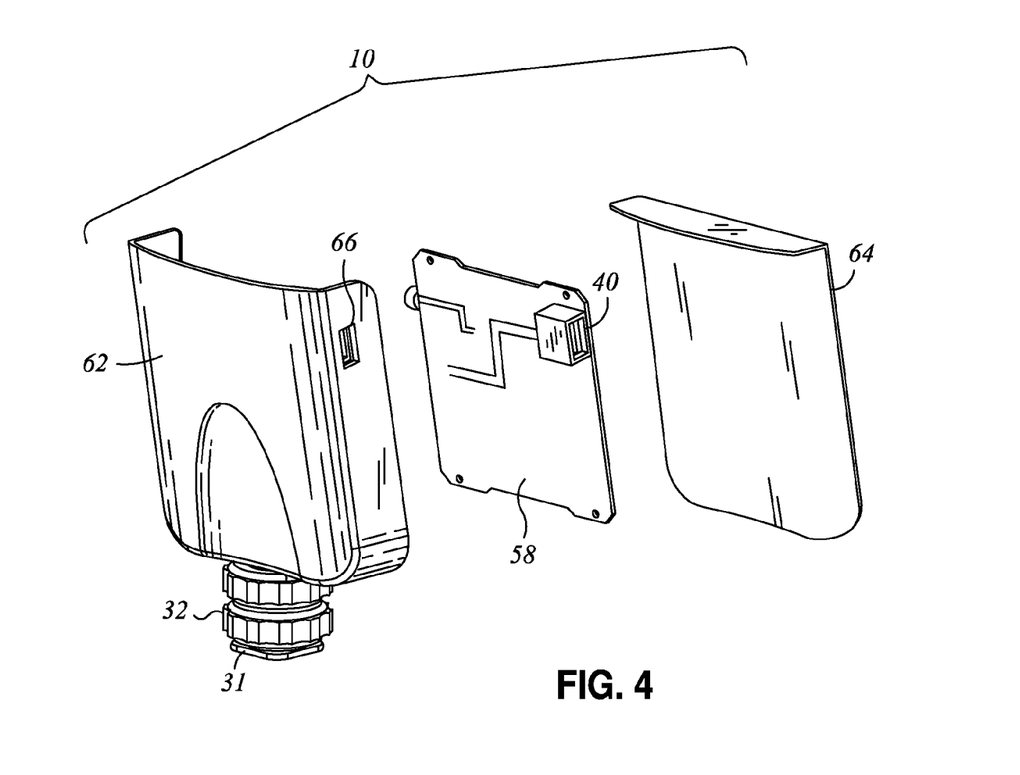
FIG. 4 is an exploded perspective view of an enclosure and circuit board of the wireless camera control and view system.

As best illustrated in the exploded diagram of FIG. 4, some of the aforementioned components of the interface system 10, including the USB port 40, the processor 42, the memory 46, USB host 48, the power regulator 56, and the WiFi module 50 are mounted to a circuit board 58. Together with the power source 54, the populated circuit board 58 is enclosed within a housing 60. According to one embodiment, the housing 60 is comprised of a frame portion 62 and an overlapping cover portion 64. The frame portion 62 is understood to include the adapter 31 and the clamping fastener knob 32 for attachment to the hot shoe 30 of the body unit 14. Furthermore, the frame portion 62 defines an opening 66 that is in alignment with the USB port 40 so that the connector 36 can be passed through. It will be recognized that this is but one configuration of the housing 60, and alternative form factors are also possible. The illustrated housing 60 is presented by way of example only and not of limitation.

Figure 5:
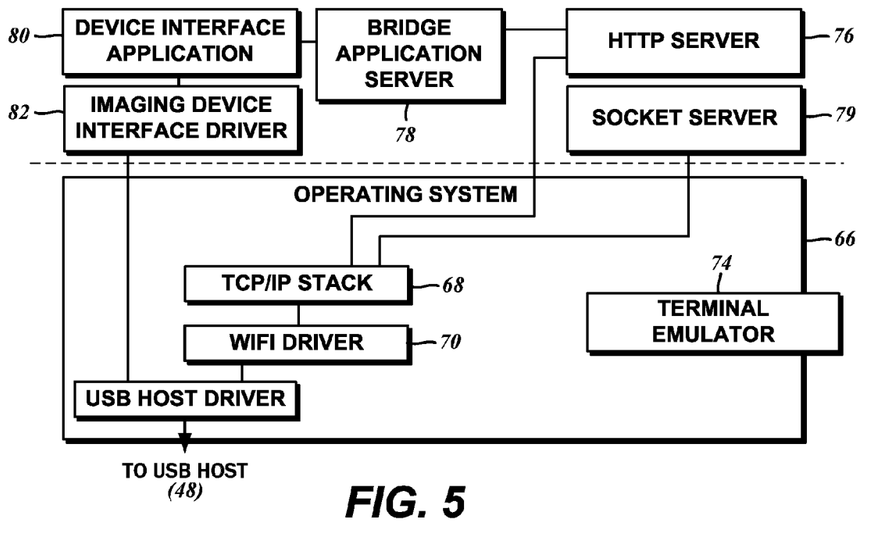
FIG. 5 is a block diagram of the various software modules running on a central processor of the wireless camera control and view system.

Certain features of the interface system 10 are implemented as software modules or applications. The block diagram of FIG. 5 illustrates some of the pertinent modules and their interrelationships. As a general matter, a real time operating system 66 governs access to all of the hardware resources of the interface system 10, including the processor 42, the input/output ports 44, and the memory 46. To the extent that any other software module needs to utilize the processing and memory resources, those requests are made through a scheduler. The operating system 66 includes several submodules that handle specialized functions such as data communications. In further detail, there is a TCP/IP stack 68 that implements the transmission control protocol (TCP) and the internet protocol (IP) for node addressing, link establishment, error-corrected data transfers, and other purposes. At the physical network level, a WiFi driver 70 governs the operation of the WiFi module 50, which cooperates with a USB host driver 72 to communicate with the USB host 48 at the hardware level. The TCP/IP stack 68 is understood to assign the interface system 10 with a single IP address, though remote devices can establish independent network links to separate software modules of the interface system 10 with different port identifiers.

One possible operating system 66 that could be utilized is the freely available Linux operating system. There are certain advantages associated with such an implementation, or any other implementation that utilizes a standardized operating system such as UNIX, as all of its standard features have an extensive development and usage history, in particular, the data communications and networking features. Because the functionality of the operating system 66 is well known, the development of add-on applications is more straightforward, and existing development tools can be leveraged. Along these lines, there is a terminal emulator 74 that can be utilized to login to the interface system 10 remotely and access the standard features of the operating system 66 for development purposes. A default installation of the Linux operating system typically includes the aforementioned TCP/IP stack 68, the USB host driver 72, the WiFi driver 70, as well as an HTTP (Hypertext Transfer Protocol) server 76, also referred to as a web server. Again, with the use of such off-the-shelf software components, oft-used functions such as image data transfers via IP networks is optimized.

Besides the HTTP server 76, other software applications may be run on the operating system 66. These include a bridge application server 78, a socket server 79, and a device interface application 80. Most imaging devices 12 connectible via USB implement the standard mass storage device class that provides a standardized way to access the image data stored in memory. Another is the picture transfer protocol (PTP). The image transfer functions, whether by the standardized USB mass storage, PTP, or some other manufacturer specific modality, are understood to be implemented in an imaging device interface driver 82.

Additionally, via the USB interface, it may be possible to communicate instructions to the imaging device 12 that modify settings and configuration options, and that operate the shutter. This functionality is likewise provided by the imaging device interface driver 82 and/or the device interface application 80. Because the specifics structure of the instructions to the imaging device 12 may vary, there may be a database or other listing of such specific instructions that is selected for use upon the reading of an identifier therefrom.

The division of performed functions between the device interface application 80 and the imaging device interface driver 82 can vary depending upon the specifics of the implementation. Any link to the imaging device 12 is understood to be over USB, so the device interface application 80 and the imaging device interface driver 82 cooperate with the USB host driver 72 to access the USB host hardware 48. A combination of some or all of the USB port 40, USB host 48, the USB host driver, and the imaging device interface driver 82 may also be referred to as a second data communications interface.

Figure 6:
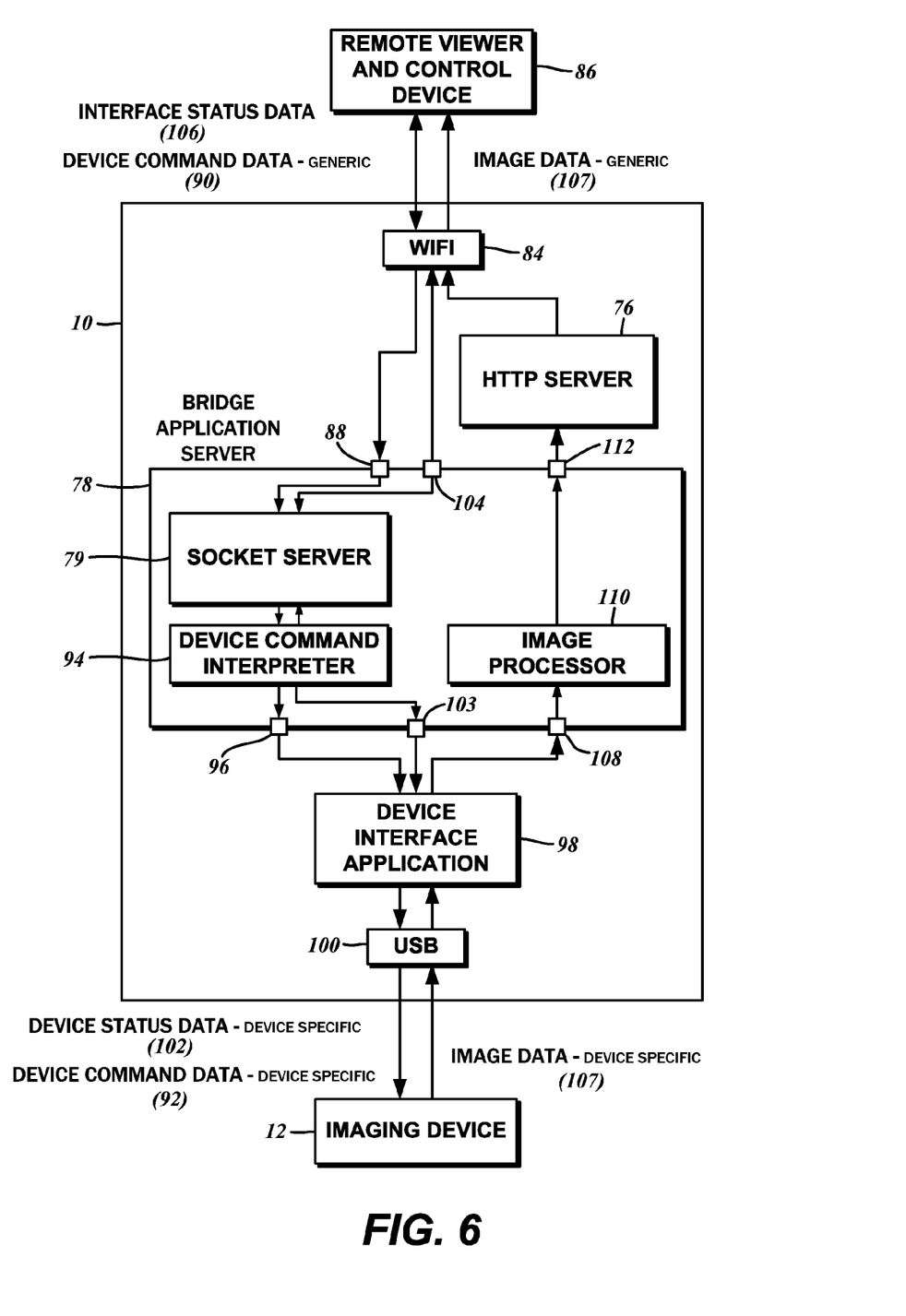
FIG. 6 is a block diagram illustrating the intercommunications between the software modules.

Having considered the various component modules of the interface system 10, additional details regarding the various functions thereof and the interoperating relationships between the component modules will now be discussed with reference to the block diagram of FIG. 6. As mentioned above, the interface system 10 includes a first data communications interface 84, i.e., the combination of one or more of the WiFi module 50, the TCP/IP stack 68, the WiFi driver 70, the USB host driver 72, the USB host 48, and the USB port 40. The first data communications interface 84 wirelessly communicates over the WLAN 802.11x protocol with a remote viewer and control device 86, which may be a tablet, laptop computer, smart phones, etc. The remote viewer and control device 86 is understood to have a corresponding WiFi module and general data processing capabilities for executing instructions of a web browser application.

The first data communications interface 84 is linked to the HTTP server 76, as well as the bridge application server 78. In this regard, there may be a device control input 88 that is connected to the first data communications interface 84. Some implementations of the bridge application server 78 incorporate the aforementioned socket server 79, which is receptive to generic device control commands 90. Relative to all other devices on an existing WiFi network, the interface system 10 is assigned a single IP address as set by the first data communications interface 84.

Figure 7:
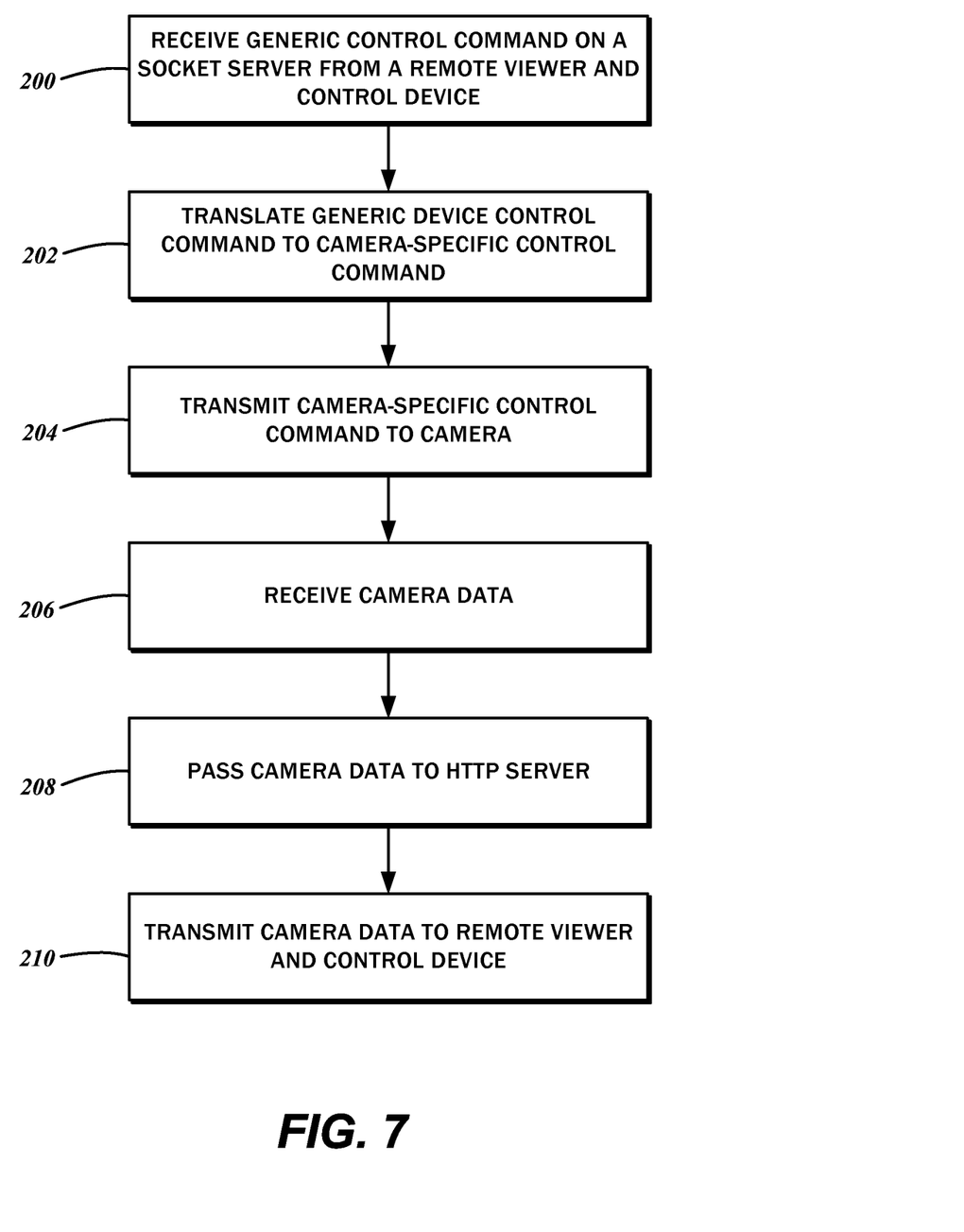
FIG. 7 is a flowchart of one embodiment of a method for controlling a camera.

Along these lines, another embodiment of the present disclosure contemplates a method for controlling the camera or imaging device 12. As shown in the flowchart of FIG. 7, the method includes a step 200 of receiving the generic device control command 90 on the socket server 79. The generic device control commands 90 are generated by the remote viewer and control device 86. The present disclosure contemplates the control of a wide range of different imaging devices 12 that may each have a different instruction sets for operating and modifying settings, while employing a unified and consistent remote user interface. As such, regardless of the imaging device 12 to which the interface system 10 is connected, the remote viewer and control device 86 interacts with the interface system 10 in the same way, and transmits the same generic device control commands 90. Some of the contemplated instructions include an aperture or f/stop modification command, a shutter speed modification command, a white balance modification command, and an imaging sensor sensitivity/ISO modification command. Besides instructions for modifying the operating parameters of the imaging device 12, instructions for the operation of the imaging device 12 such as a shutter trip command, re-setting autofocus command, and the like are also contemplated. The foregoing non-exhaustive itemization of commands is by way of example only, and not of limitation.

Figure 8:
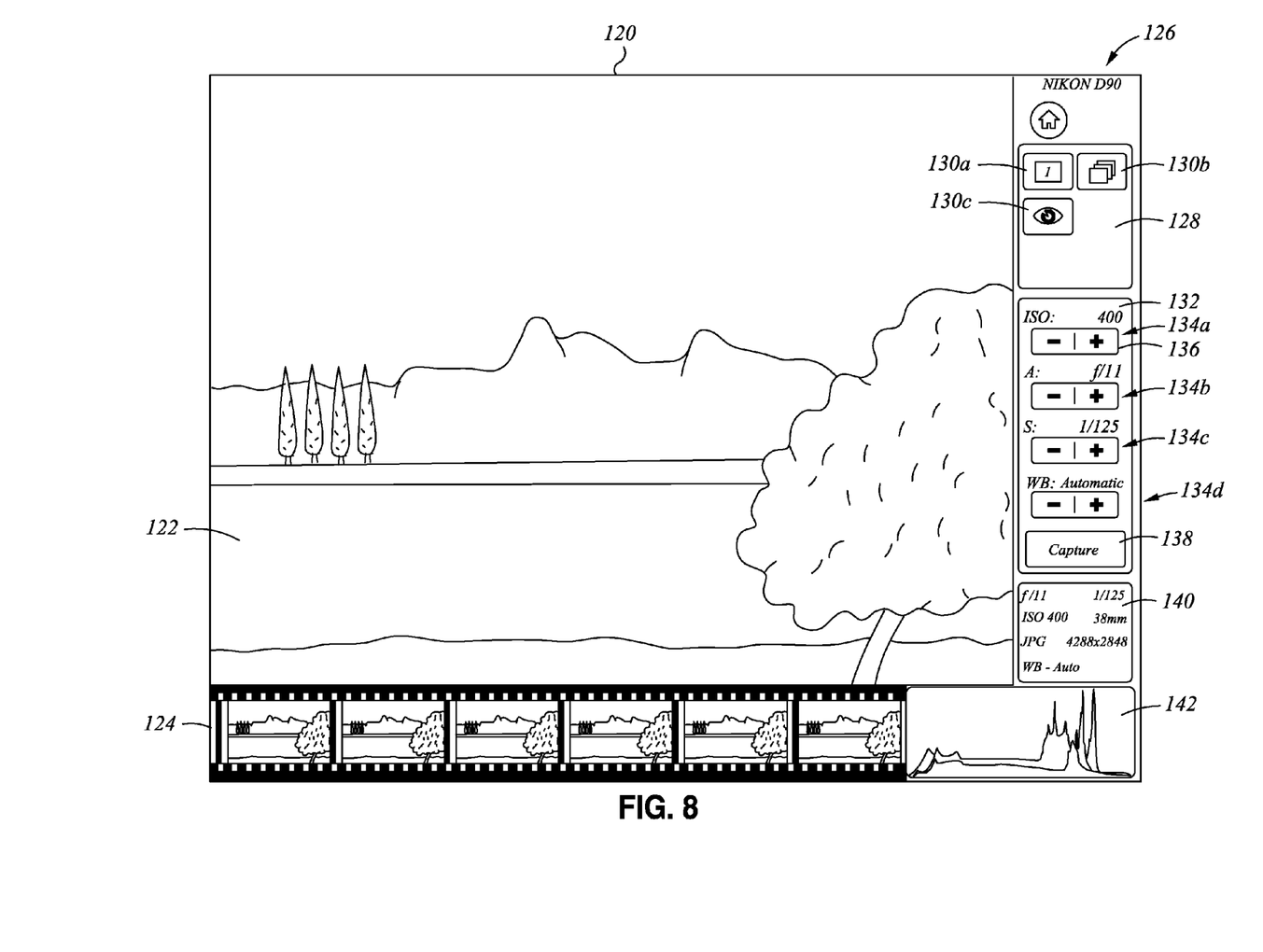
FIG. 8 is an example screen capture of one embodiment of an interface that is presented to a user of a remote viewer and control device that connects to the wireless camera control and view system.

FIG. 8 depicts one exemplary implementation of a display interface 120 that could be rendered on the remote viewer and control device 86. The display interface 120 is segregated into multiple sections, including a primary panel 122 that shows the most recent photograph captured by the imaging device 12, as well as an image reel panel 124 that shows miniaturized/thumbnail versions of previously captured photographs. There is additionally a control panel 126 through which the generic device control commands 90 may be invoked. The control panel 126 is separated into several different sub-panels of related functions.

In a shooting mode subpanel 128, there is a first icon 130a corresponding to a single shot mode, in which each activation of the shutter button captures one image. A second icon 130b is understood to correspond to a burst mode that captures multiple images in response to a single shutter button activation. Additionally, there is a third icon 130c that corresponds to a time delayed shooting mode in which activation of the shutter button initiates a countdown timer. Upon expiration of the countdown timer, the shutter is tripped. Selecting one of the icons 130 is understood to generate a corresponding generic control command, and as will be described in further detail below, also invokes the imaging device 12 to generate a confirmation that the setting has been changed.

With an exposure subpanel 132, it is possible to set the various exposure settings, and activate the shutter. More particularly, there is a sensor sensitivity segment 134a, an aperture segment 134b, a shutter speed segment 134c, and a white balance segment 134d. The settings can be incrementally adjusted by activating plus/minus buttons 136, and the shutter can be tripped via a shutter button 138. Upon activating the foregoing buttons, the corresponding generic device control command 90 is generated.

In some embodiments, user control over these settings are allowed, for example, when the photographer is remotely controlling the imaging device 12 via the interface system 10 and the remote viewer and control device 86. There are some circumstances, however, where it is desirable to just show the photographs as they are being taken, such as when a client or other non-staff third party is observing a photo shoot. In such case, the above-described subpanels may be hidden, displayed subdued, or otherwise rendered inaccessible.

The particular layout of the display interface 120, including the contents of the subpanels, are presented by way of example only and not of limitation. Depending on the needs of the user (whether a photographer or just an observer), more or less information could be displayed on the remote viewer and control device 86.

The data transmitted by the remote viewer and control device 86 is directly addressed to the bridge application server 78, and more specifically, the socket server 79, by including a destination port identifier that corresponds to the second port identifier of the socket server 79. The first data communications interface 84 is understood to parse the destination port identifier and route the data to the socket server 79 accordingly. Although the HTTP server 76 is capable of bidirectionally communicating with the remote viewer and control device 86, according to various embodiments, it is bypassed. As will be recognized by those having ordinary skill in the art, remote nodes must communicate with the HTTP server 76 in a particular manner that requires substantial data overhead. Direct communications with the socket server 79 is understood to reduce that data overhead, and speed communications. This may be advantageous for issuing instructions such as shutter trip commands that require a real-time response.

Referring again to the flowchart of FIG. 7, the method continues with a step 202 of translating the generic device control command 90 to a camera or device-specific control command 92. A device command interpreter 94 may query the aforementioned database, table or other like data structure that correlates the generic device control commands 90 to equivalent camera specific control commands 92 that can be recognized by the imaging device 12. The bridge application server 78 may include a device control output 96 that is the output of the device command interpreter 94. Although utilizing a standard USB connection, the way in which commands are passed to the imaging device 12 may be different from the standard USB mass storage class or picture transfer protocol modalities. Thus, there may additionally be a device interface application 98 that communicates with a corresponding module on the imaging device 12. The USB communications link is established by a second data communications interface 100 generally comprised of a combination of some or all of the USB port 40, USB host 48, the USB host driver, and the imaging device interface driver 82. Following the translation step 202, the method may then proceed to a step 204 of transmitting the translated camera specific control commands 92 to the imaging device 12.

In some cases, issuing the camera specific control command 92 may result in the imaging device 12 generating verification that such command has been received, and acted upon. For example, in response to setting an f/stop to a particular value as requested through the generic device control command 90, the imaging device may generate a responsive device status data 102 indicating that the imaging device 12 has indeed modified the f/stop to the requested value.

In other instances, the imaging device 12 may generate a device status data 102 in response to some action taken or input received thereon. One possible example where this may occur is when the photographer activates the shutter button directly on the camera, and an image is captured and stored. The imaging device 12 may then generate a corresponding device status data 102 indicating that this has occurred.

Whether generated in response to a camera specific control command 92 or spontaneously, the received device status data 102 is passed to the second data communications interface 100 and the device interface application 98. The bridge application server 78, and more specifically the device command interpreter 94, includes the functionality to translate such device-specific information that can be universally recognized by any remote viewer and control device connecting to the interface system 10. Thus, the bridge application server 78 includes a device status input 103 to the device command interpreter 94. The socket server 79 then generates a datagram addressed to the remote viewer and control device 86 that is passed through a device status output 104 of the bridge application server 78. As the bridge application server 78 may also generate additional information of use to the remote viewer and control device 86, all information passed from the device status output 104 may also be referred to as interface status data 106.

When a photograph is captured by the imaging device 12, the corresponding data 107 is transmitted to the interface system 10 by one of several modalities discussed above. The image data 107 is received by the device interface application 98, and passed to the bridge application server 78 via a device image input 108, which is independent of the device control output 96 and the device status input 102. In the contemplated method for controlling the camera, there is thus a step 206 of receiving camera data from the imaging device 12. It is noted that the aforementioned device status data 103 is also one form of the camera data received in the step 206, in addition to the captured image data 107. According to some embodiments, the camera data is received in response to the issued camera specific control command 92, but as discussed above, the imaging device 12 may generate the camera data without any requests from the interface system 10.

The bridge application server 78 includes an image processor 110 that receives the image data 107. Various preprocessing such as white balance adjustment, compression, and so forth may be applied to the image data, or may simply be stored in the memory 46 of the interface system 10. In accordance with a step 208, the image processor 110 then passes the camera data/image data 107 to the HTTP server 76 via a device image output 112. Various embodiments of the present disclosure contemplate the transmission of the image data 107 to the remote viewer in control device 86 over the first data communications interface 84. Along these lines, the method includes a step 210 of transmitting the camera data to the remote viewer and control device 86. Os mentioned above, the HTTP server 76 is likewise assigned the same IP address by virtue of the first data communications interface 84, but data traffic is indicated as originating from a first port identifier that is different from the second port identifier of the bridge application server 78/socket server 79.

In further detail, upon receipt of the image data 107 from the bridge application server 78, the HTTP server 76 generates a web page with the image being embedded therein. Contemporaneously, the bridge application server 78, via the socket server 79, generates a data availability indicator to the remote viewer and control device 86. In response to receiving the data availability indicator, the remote viewer and control device 86 initiates a request for the identified web page that includes the image data 107. The HTTP server 76 then responds to the request and transmits the web page to the remote viewer and control device 86.

Referring again to the display interface 120 of FIG. 8, the image data 107 is rendered within the primary panel 122. Within the control panel 126, there is also an exposure settings display subpanel 140 that shows the recorded exposure settings (f/stop, shutter speed, ISO, focal length, white balance, and image compression/size) of the corresponding image. Additionally, a histogram subpanel 142 shows a graphical representation of color and intensity distribution of the corresponding image.

The particulars shown herein are by way of example and for purposes of illustrative discussion of the embodiments of the present disclosure only and are presented in the cause of providing what is believed to be the most useful and readily understood description of the principles and Conceptual aspects. In this regard, no attempt is made to show details of the present invention with more particularity than is necessary, the description taken with the drawings making apparent to those skilled in the art how the several forms of the present invention may be embodied in practice.

What is claimed is:

1. An interface system for an imaging device comprising:
   a first data communications interface;
   a second data communications interface connectible to a corresponding input/output port of the imaging device;
   a web server connected to the first data communications interface; and
   a bridge application server having a device control input connected to the first data communications interface, a device image output connected to the web server, and a device control output and a device image input both separately linked to the second data communications interface;
   wherein generic device control commands received from the first data communications interface are passed to the bridge application server bypassing the web server, and image data received from the imaging device via the second data communications interface are passed to the web server for transmission to a remote viewer and control device.

2. The interface device of claim 1, wherein the bridge application server includes a socket server receptive to the generic device control commands.

3. The interface device of claim 2, wherein the bridge application server further includes a device command interpreter translating the received generic control commands to imaging device-specific control commands passed to the second data communications interface.

4. The interface device of claim 2, wherein:
   the web server and the bridge application server are assigned a single Internet Protocol address;
   the web server is assigned a first network port identifier, the image data including a transmission source port field corresponding to the first network port identifier; and
   the bridge application server is assigned a second network port identifier, the generic device control commands including a transmission destination port field corresponding to the second network port identifier.

5. The interface device of claim 1, wherein the bridge application server includes an image processing module receptive to the image data from the imaging device for transfer to the web server.

6. The interface device of claim 5, wherein the bridge application server transmits a data availability indicator to the remote viewer and control device upon receipt of the image data from the imaging device.

7. The interface device of claim 5, wherein the web server incorporates the image data into page content generated thereby.

8. The interface device of claim 7, wherein the page content is transmitted to the remote viewer and control device in response to a data request.

9. The interface device of claim 1, wherein the generic and imaging device-specific control commands includes at least one of an aperture setting modification command, a shutter speed modification command, a white balance modification command, a shutter trip command, and an imaging sensor sensitivity modification command.

10. The interface device of claim 1, wherein the first data communications interface is a Wireless Local Area Network (WLAN) interface.

11. The interface device of claim 1, wherein the second data communications interface and the input/output port of the imaging system are Universal Serial Bus (USB)-compliant.

12. A wireless camera control and view system attachable to a camera, the system comprising:

an on-board power source;

a wireless networking interface linkable to a remote viewer and control device;

a serial data communications interface connectible to an input/output interface of the camera; and a central processor module connected to the wireless networking interface and the serial data communications interface, the central processor module being programmed with executable instructions of:

a bridge application server including a socket server receptive to generic camera control commands from the wireless networking interface and a camera command interpreter translating the generic camera control commands to camera-specific control commands parsable by the camera; and a web server receptive to image data from the camera and image requests from the remote viewer and control device, wherein the web server generates a page including image data in response to a corresponding image request for transmission to the remote viewer and control device.

13. The system of claim 12, wherein the bridge application server further includes a command translation data structure including at least one generic camera control command and a logical link to a corresponding camera-specific control command.

14. The system of claim 13, wherein the bridge application server includes a plurality of command translation data structures each corresponding to a specific camera variant.

15. The system of claim 12, wherein the generic and camera-specific control commands includes at least one of an aperture setting modification command, a shutter speed modification command, a white balance modification command, a shutter trip command, and an imaging sensor sensitivity modification command.

16. The system of claim 12, further comprising:

an enclosure for the on-board power source, the wireless networking interface, the serial data communications interface, and the central processor module; and a mounting adapter structurally integrated with the enclosure and attachable to the camera.

17. The system of claim 16, wherein the camera includes a flash shoe, the mounting adapter being cooperatively engagable thereto.

18. The system of claim 12, wherein the wireless networking interface is a WLAN interface.

19. The system of claim 12, wherein the serial data communications interface and the input/output interface of the camera are USB-compliant.

20. A method for controlling a camera, comprising:

receiving on a socket server a generic control command from a remote viewer and control device over a first data communications link, the socket server being assigned a second network port identifier and the generic control command including a transmission destination port corresponding to the first network port identifier;

translating the generic control command to a camera-specific control command;

transmitting the camera-specific control command to the camera over a second data communications link;

receiving camera data from the camera over the second data communications link, the camera data being generated in response to the camera-specific control command;

passing the camera data to a web server, the web server being assigned a first network port identifier; and transmitting the camera data to the remote viewer and control device, a source port identifier of the camera data being the first network port identifier of the web server;

wherein the socket server and the web server are assigned a common Internet Protocol address.

21. The method of claim 20, further comprising:

transmitting a camera data availability indicator to the remote viewer and control device in response to receipt of the camera data on the web server.

22. The method of claim 20, wherein:

the camera data is image data; and the camera-specific control command is a shutter trip command.

23. The method of claim 20, further comprising:

the camera data is camera setting data; and the camera-specific command is one of an aperture setting modification command, a shutter speed modification command, a white balance modification command, and an imaging sensor sensitivity modification command.

24. The method of claim 20, wherein:

the first data communications link is WLAN; and the second data communications link is USB.

* * * * *